(12) United States Patent
Goldberg et al.

(10) Patent No.: US 6,694,223 B1
(45) Date of Patent: Feb. 17, 2004

(54) IRRIGATION CONTROLLER (75) Inventors: Allan Morris Goldberg, Laguna Niguel, CA (US); Larry Kent Hopkins, Escondido, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/164,472

(22) Filed: Jun. 6, 2002

Related U.S. Application Data (63) Continuation-in-part of application No. 09/510,489, filed on Feb. 23, 2000.
(60) Provisional application No. 60/121,220, filed on Feb. 23, 1999.

(51) Int. Cl.[7] .............................................. G06F 15/46
(52) U.S. Cl. ........................... 700/284; 700/14; 700/16; 700/19; 239/69; 137/624.11
(58) Field of Search ............................... 700/14, 16, 19, 700/284; 239/69; 137/624.11–624.2

(56) References Cited

U.S. PATENT DOCUMENTS

| | | | | |
|---|---|---|---|---|
| 4,760,547 A | * | 7/1988 | Duxbury | 700/284 |
| 5,363,290 A | * | 11/1994 | Doup et al. | 700/16 |
| 5,381,331 A | * | 1/1995 | Mock et al. | 700/16 |
| 5,414,618 A | * | 5/1995 | Mock et al. | 700/16 |
| 5,473,309 A | * | 12/1995 | Marcum | 340/514 |
| 5,568,376 A | * | 10/1996 | Benmergui et al. | 700/16 |

* cited by examiner

*Primary Examiner*—Leo Picard
*Assistant Examiner*—Douglas S. Lee
(74) *Attorney, Agent, or Firm*—Stout, Uxa, Buyan & Mullins, LLP (57) ABSTRACT

A simple single- or multi-station sprinkler controller is set to various run times and watering intervals by the repetitive operation of pushbuttons or combinations of pushbuttons. The chosen settings are communicated to the operator by illumination patterns of LEDs. The patterns may include groups of flashes, sequential scrolling of LEDs, multicolored illumination of an LED, and steady illumination or non-illumination of selected LEDs. If a short occurs in a station, the controller shuts itself off and flashes a pattern that signals a shorted condition and identifies the shorted station. On power-up, run times and intervals are automatically set to generally-usefll default values.

14 Claims, 12 Drawing Sheets

IRRIGATION CONTROLLER

RELATED CASES

This is a continuation-in-part of application Ser. No. 09/510,489 filed Feb. 23, 2000, which in turn is a regular filing corresponding to Provisional Application Serial No. 60/121,220 filed Feb. 23, 1999.

FIELD OF THE INVENTION

This invention relates to irrigation controllers, and more particularly to a single-or multi-station controller which is inexpensive and easy to program, and which uses only a minimal set of pushbutton controls and visual indicators to carry out and indicate relatively complex programming functions.

BACKGROUND OF THE INVENTION

A large variety of controllers are commercially available for controlling the automatic operation of irrigation sprinklers in residential and industrial applications. These controllers vary in complexity and cost all the way from single-station, battery-powered units with few programming options that are mounted directly on a water valve, to complex, computer-programmable wall-mounted units capable of operating a complex irrigation system with many stations that require different operating parameters. Existing controllers are generally complicated and time-consuming for an unskilled owner to program. This causes many home controllers to be set once upon installation, and not to be periodically readjusted to fit changing conditions.

For this reason, and also because of the price consciousness of most homeowners, a need exists for both a single-station and a multi-station controller that is simple and inexpensive, powers up with a useful default set of operating parameters upon installation, and is simple to set to different parameters at any time.

SUMMARY OF THE INVENTION

The present invention fills the above-described need by providing, in the first two embodiments described herein, a multi-station controller with three actuators such as pushbuttons that select, respectively one of a set of predetermined combinations of water cycle length and repetition rate (i.e. the number of days between watering cycles); a start time-of-day; and a manual operation. On power-up, the inventive controller defaults to a generally appropriate cycle length, repetition rate and start time, which can then be changed by pushing the buttons. Alternatively, with an extra button as shown in the second embodiment, the watering time for each station can be set individually.

Operational parameter settings and controller status are indicated in the inventive controller by a set of simple indicators such as lights or light-emitting diodes (LEDs), preferably at least one for each cycle (in the first embodiment) or station (in the second embodiment), which convey information by their combinations and actions (e.g. scrolling, illumination, flashing and/or blinking).

If only a single station is to be controlled, as in the third embodiment described herein, the functions of the controller can be performed with only two pushbuttons, by using one or both pushbuttons.

DESCRIPTION OF THE PREFERRED EMBODIMENT

Figure 1:
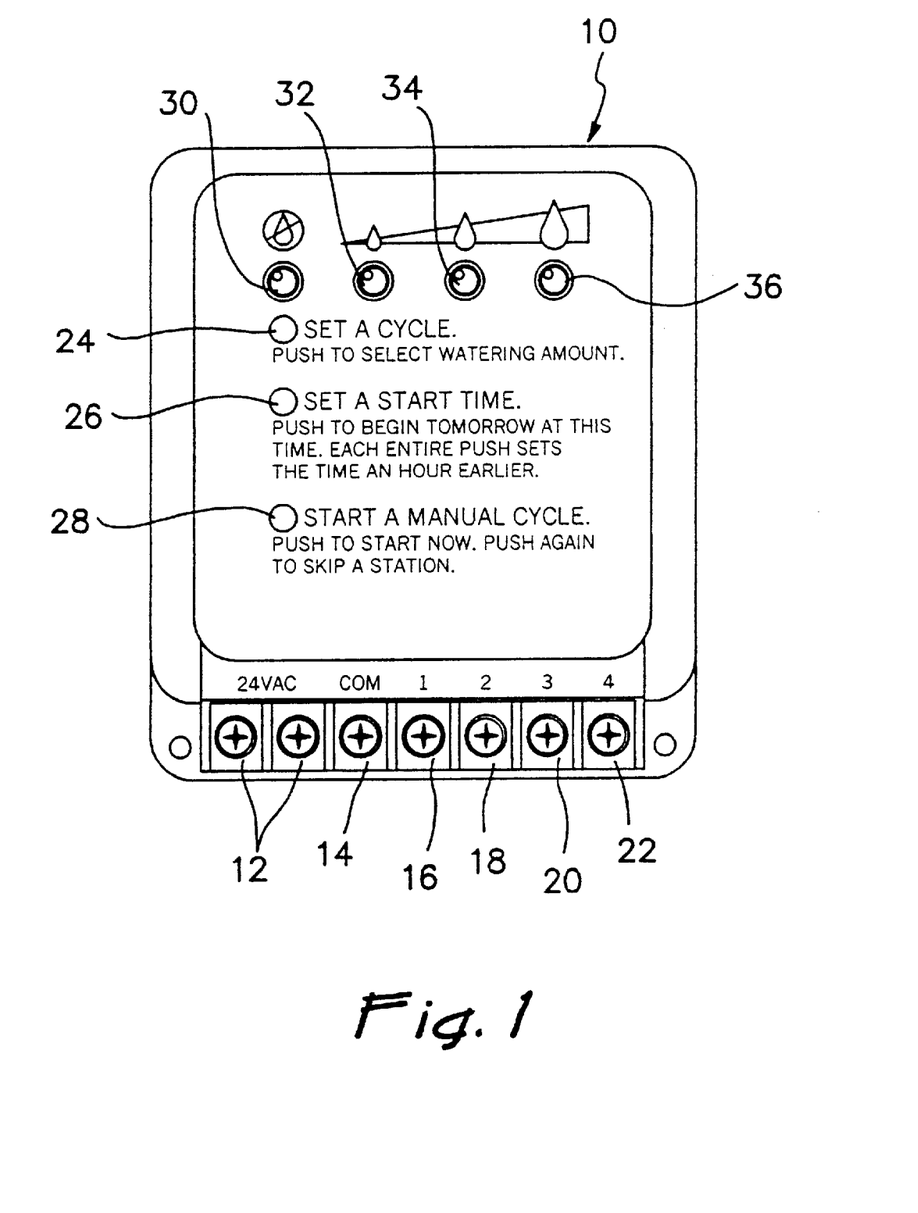
FIG. 1 is a front elevation of the face plate of a preferred embodiment of the invention.

FIG. 1 illustrates the simple face plate 10 of a representative embodiment of the invention. At the bottom of the face plate 10, connectors 12 are the power inputs to the inventive controller (typically 24 V AC for safety); connector 14 is the common ground for the four watering stations; and connectors 16, 18, 20 and 22 are the switched terminals of the four watering stations.

Pushbutton 24 sets the watering cycle length and repetition rate; pushbutton 26 sets the start time; and pushbutton 28 starts a manual cycle. Indicator lights 30, 32, 34 and 36 provide information on the controller status and settings as described below.

The controller of this invention is intended for the homeowner market. Consequently, simplicity of operation and low cost are dominant considerations, even though they come at the expense of versatility. In this regard, it has been found that homeowners with little gardening skills or interest, at least in the warmer climates, do not care to repeatedly fine-tune their sprinkler systems. Such homeowners are only interested in setting their sprinklers to seasonal changes in watering conditions, to run them manually when necessary, or to turn them off during protracted periods of rain. It is therefore possible to determine, based on the climatic conditions of a particular market, a set of cycle length and repetition rate parameters that is generally suitable for a given season in that market.

The present invention makes use of this fact in reducing the complexity and cost of a controller by combining cycle lengths and repetition rate settings into a set of single settings such as heavy (summer), medium (spring/fall) and light (winter) watering. Thus, the homeowner merely needs to select a-watering level and a start time, and the controller does the rest. To accommodate special situations, a no-watering setting and a manual start for a selected station or stations are provided.

Figure 2:
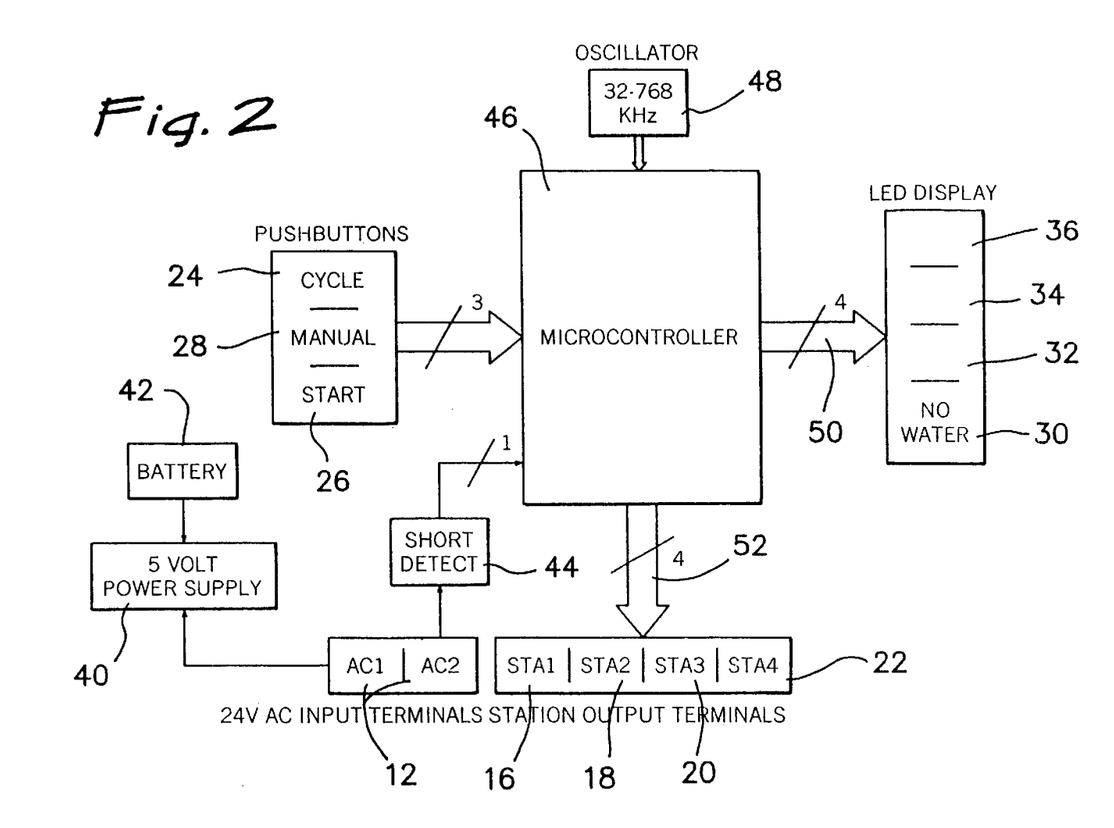
FIG. 2 is a block diagram of the circuitry of the controller of FIG. 1.

FIG. 2 outlines the overall architecture of the controller of this invention. 24V AC power is applied to terminals 12. The input power operates a 5V DC power converter 40 which powers the control electronics of the controller. A battery 42 may be connected to the converter 40 as a stand-by power source if desired.

A short circuit detector 44 monitors the current drawn by each station output 16 through 22 from the input 12 for one full AC cycle, i.e. 16.7 ms, on power-up, and also monitors it continually whenever a station is on. If an overcurrent indicative of a short circuit occurs, the detector 44 sends a signal to the microcontroller 46 to shut off all stations and flash all the LEDs 30 through 36 with a blinking code indicating the station which was energized when the short was detected.

The internal clock for the microcontroller 46 is provided by an oscillator 48 which, in the preferred embodiments, operates at 32.768 kHz in order for the clock timer to synchronize with real time. The operations of microcontroller 46 are controlled, as detailed below, by the pushbuttons 24, 26 and 28. The outputs of microcontroller 46 are the lines 50 to the LEDs 30 through 36, and the lines 52 which selectively enable one of the station outputs 16 through 22 to be connected to the power input 12.

Figure 3:
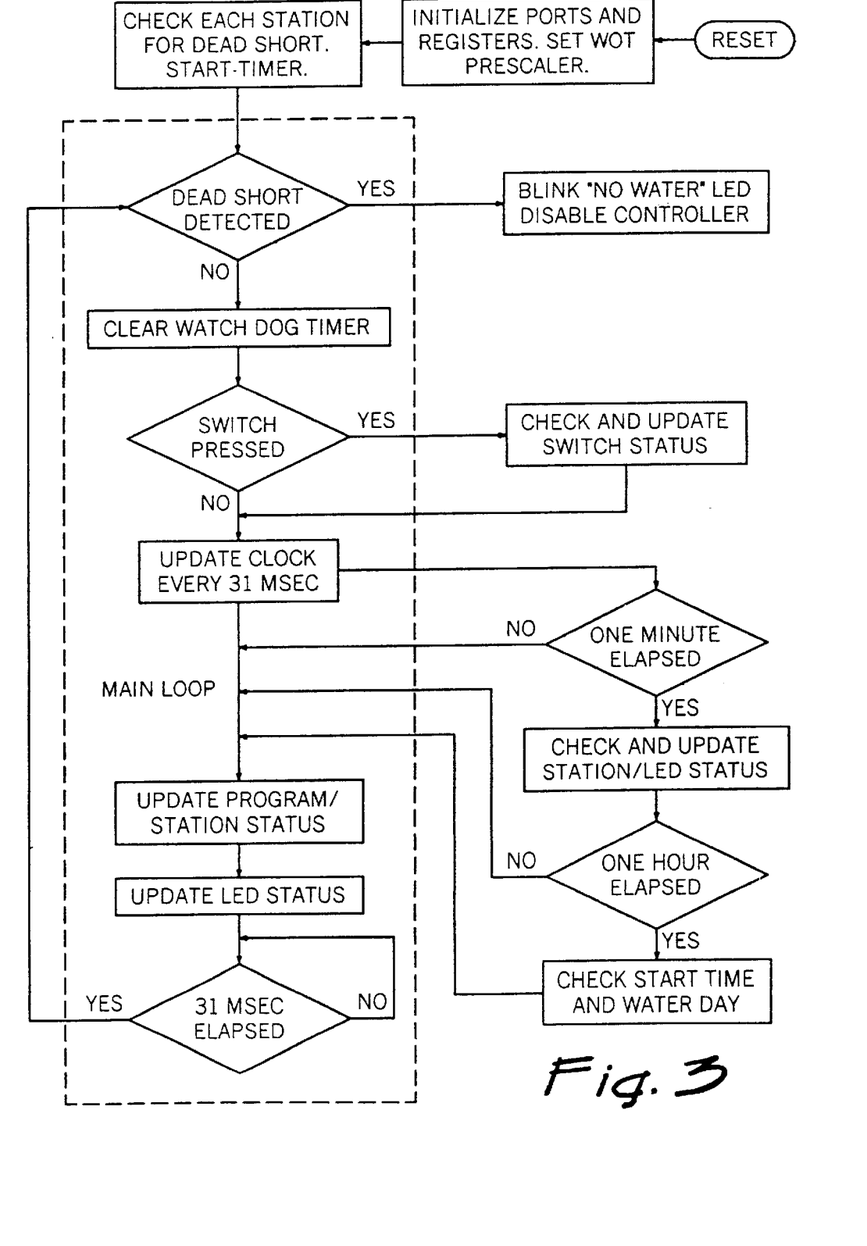
FIG. 3 is a flow chart of the operation of the microcontrollers of FIGS. 2 and 5.

FIG. 3 shows the basic operation of the microcontroller 46. Upon power-up or a watchdog timer reset, the microcontroller's ports and registers are initialized to their default settings, which preferably include the medium watering cycle and a start time of twenty-four hours after power-up. The LEDs 30 through 36 are set to scroll. The microcontroller's built-in watchdog timer (WDT) is scaled to about 1 second. Each station is next sequentially checked for short circuits as described above, and the WDT is started. If a short circuit has been detected, the controller is disabled and the short-indicating LEDs are set to flash with a blinking code indicative of the station on which the short circuit was detected, i.e. once for station 16, twice for station 18, three times for station 20, and four times for station 22.

If a short circuit is not detected on the power-up test, the program next resets the WDT and tests to see if a pushbutton has been pressed. If one has, the program updates the microcontroller register status indicated by that pushbutton. In either event, the program next updates the microcontroller's event timing clock registers. On each main loop iteration, which is preferably programmed to be 31.25 ms, the program increments and checks the timing registers. Once the seconds timing register has been incremented to indicate that a minute has elapsed, the program checks and updates the station status and LED status based on the parameters then selected or defaulted to, as the case may be. Once the minutes timing register has been incremented to indicate that an hour has elapsed, the program checks whether the start time has been reached and whether the present day is the correct day for watering. If both are true, the program initiates a watering cycle.

On each iteration of the program's main loop, the program, station, and LED statuses are updated, and the program then waits for the next iteration. Inasmuch as the WDT is reset on each 31.25 ms iteration, it does not time out unless a software glitch stops the iteration of the main loop in FIG. 3. In that case, the WDT does time out and resets the controller to the power-up mode.

The microcontroller program is preferably arranged to carry out the operation of the controller in accordance with pushbutton operation as follows: Upon power-up, the cycle setting defaults to medium watering, and the start time defaults to twenty-four hours from power-up. The four LEDs 30 through 36 flash in succession, i.e. scroll, thereby calling attention to the condition that power had shut off so that any previously selected start time and cycle settings were lost; and that, at the time power was restored, the start time and cycle setting reverted to their default values. When one of the pushbuttons 24, 26 or 28 is pressed, or a watering cycle starts, LED 34 lights and stays on. Each time a button is pressed, a short flash of all four LEDs 30 through 36 indicates that electrical contact has been made. The pushbuttons 24, 26 and 28 are preferably software-debounced in a conventional manner so that contact noise will not result in multiple operations. Software control also prevents continuous pressing from inadvertently causing the user to make an incorrect selection.

If a different watering cycle than medium watering is desired, pushbutton 24 must be pushed, repeatedly if necessary, to select high, low or no watering.

If watering is to start at a time of day different than the time of power-up, pushbutton 26 must be pushed. The first push resets the start time to twenty-four hours after that push. Each subsequent push of pushbutton 26 (made within a preset wait period) sets the start time back one hour from the first push. If, for example, a new start time of approximately 2:00 a.m. is desired and the current time is Tuesday, 10:15 a.m., a first push sets the time to 10:15 a.m. Wednesday. Eight additional pushes set the time back to 2:15 a.m. for Wednesdsay. An interval timer resets this function after a brief elapsed time, for example 10 seconds. If more than this time interval elapses between pushes of pushbutton 26, the function resets and the next push sets the start time anew to twenty-four hours after the push. Once a start time has been chosen, any watering will always start every twenty-four hours from that time.

The controller now runs on its own. At the chosen start time, the four station connectors 16 through 22 are energized in sequence for the cycle length associated with the selected cycle setting. During this time, the LED associated with the chosen cycle setting repetitively flashes one blink while connector 16 is energized (Station 1), two blinks for connector 18 (Station 2), three blinks for connector 20 (Station 3), and four blinks for connector 22 (Station 4).

In one aspect of the invention, provision is made to prevent excessive watering (which may cause undesirable runoff) during any given cycle by limiting the length of uninterrupted watering that can occur. For example, if the maximum tolerable continuous watering time is six minutes but the selected watering schedule calls for 15 minutes of watering per cycle, the microcontroller will run station 16 (if selected) for six minutes, then stations 18, 20 and/or 22 (as selected) for six minutes each. It then runs station 16 for another six minutes, followed in like manner by stations 18, 20 and/or 22. Finally, all the selected stations in sequence run for the remaining three minutes each If station 16 is the only station selected, the microprocessor inserts a five-minute break between the successive operations of station 16.

In an alternative embodiment, all watering for each station may occur at one time without repeats, as for example in installations involving very porous soil.

If a start time is encountered while the controller is in the no watering or off mode, the entire watering cycle is inhibited, and the controller remains inactive until another mode is selected. No change to the controller's settings can be made while a cycle is in progress; thus, if a cycle is in progress when the user pushes button 26, the controller's action will not change.

For manual watering, pushbutton 28 is pressed once. This immediately starts a watering sequence. Pressing pushbutton 28 again skips to the next station in the sequence. Pressing pushbutton 28 while terminal 22 is energized stops the manual watering. Manual watering may normally cause a single iteration of the stations for ten minutes each. Manual watering cannot be initiated while an automatic cycle is in progress.

During manual operation, the LED associated with the watering cycle currently selected for automatic operation blinks one or more times to identify the currently energized station. This makes it possible to check for open circuits or valve failures by monitoring the controller indication when a station fails to operate.

If a short circuit occurs in the wiring of a station, all four LEDs 30 through 36 repetitively flash together, blinking once if connector 16 is shorted, twice for connector 18, three times for connector 20, and four times for connector 22 to identify which station has the short. At the same time, the controller shuts off all stations to prevent a possibly damaging operation of the controller. Power must be turned off to remove this blinking even if the short condition is corrected.

Figure 4:
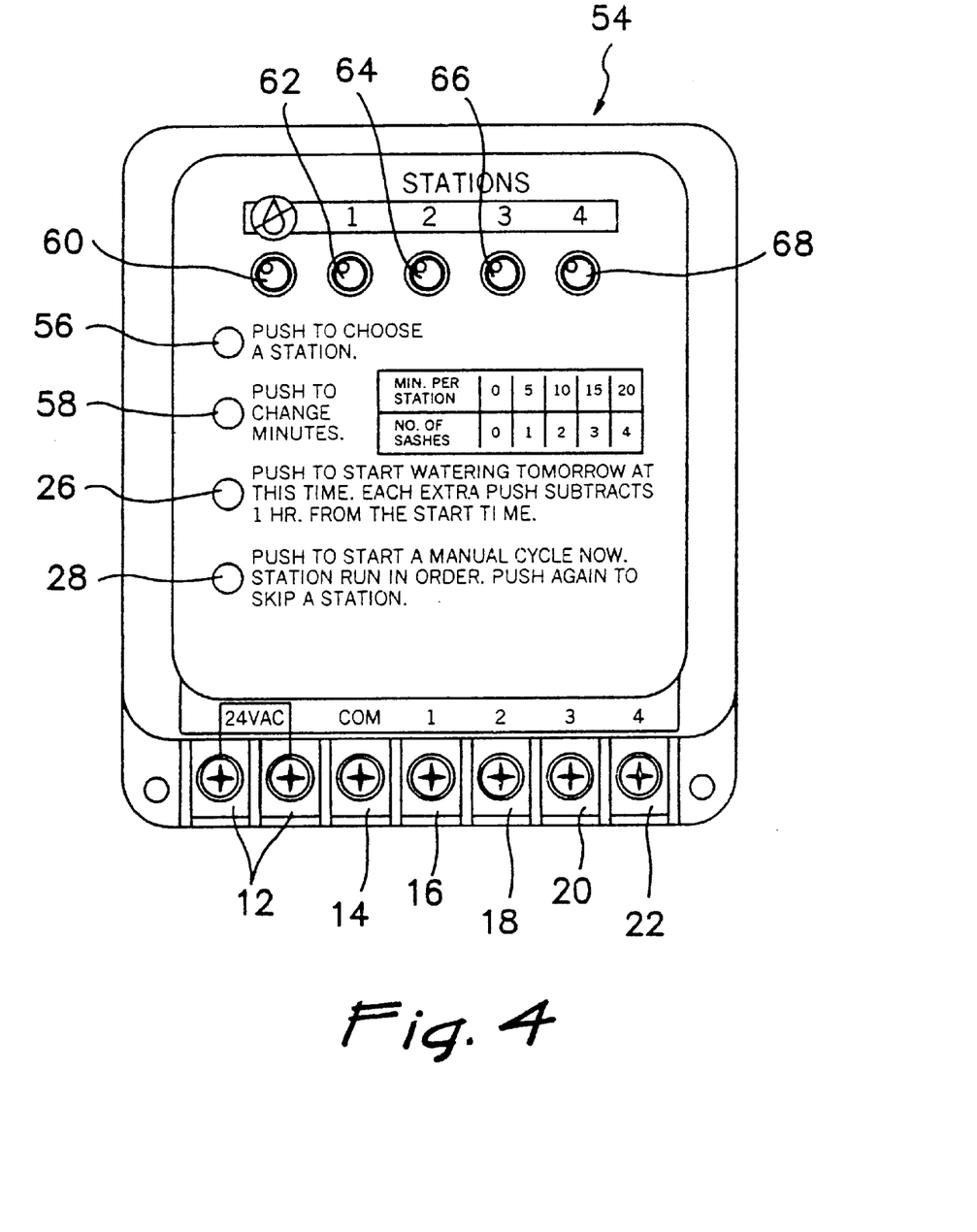
FIG. 4 is a front elevation of the face plate of an alternative embodiment of the invention.
Figure 5:
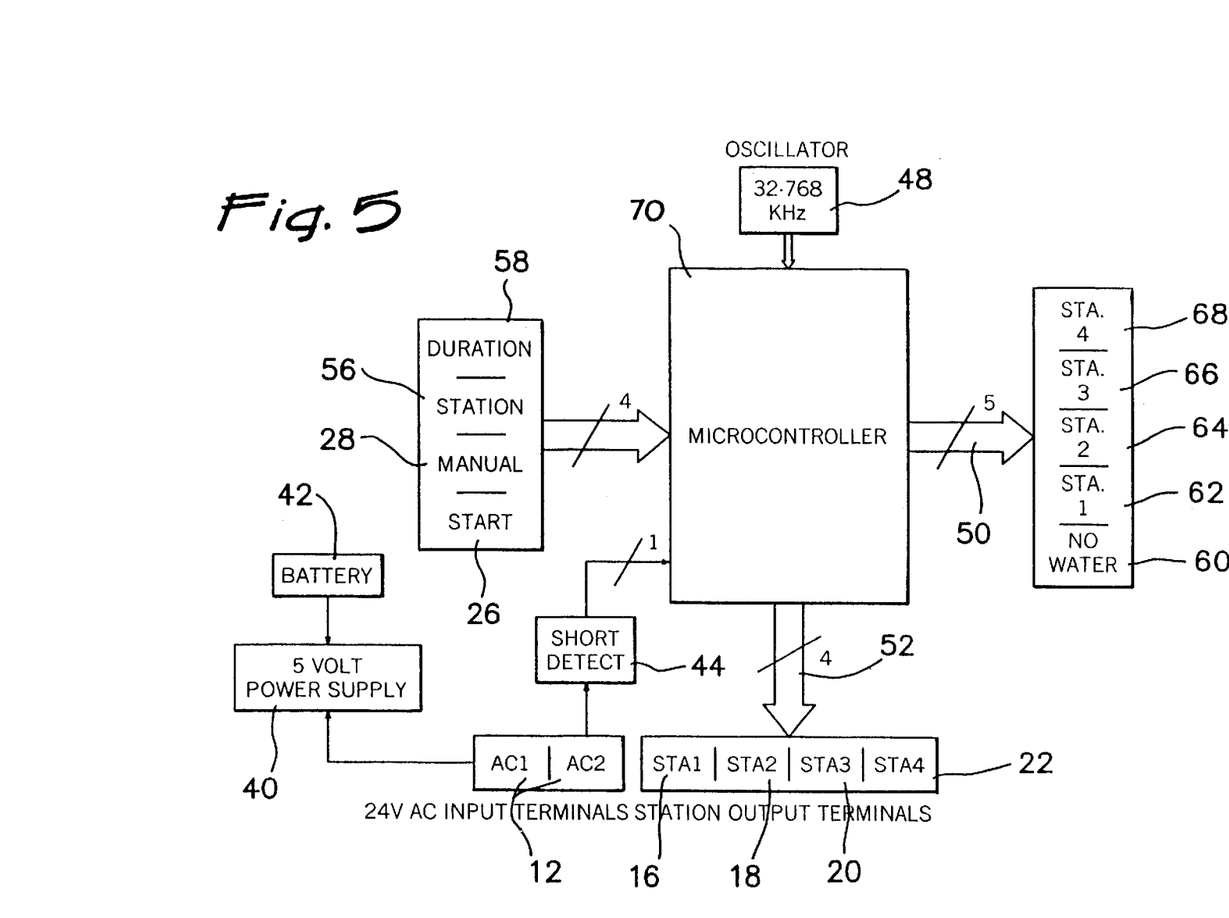
FIG. 5 is a block diagram of the circuitry of the controller of FIG. 4.

FIGS. 4 and 5 illustrate an alternative embodiment of the invention. In the embodiment of FIGS. 4 and 5, each station is separately controllable as to the cycle duration, but the repetition rate is fixed at once a day.

As shown in FIG. 4, the alternative controller 54 has the same power input 12, the same common station terminal 14, and the same station outputs 16 through 22 as the controller 10 of FIG. 1. The start button 26 and the manual button 28 also function in the same way as they do in the controller 10. The difference between the embodiments of FIG. 1 and FIG. 4 is in the pushbuttons 56, 58 and in the LEDs 60, 62, 64, 66 and 68.

In the embodiment of FIGS. 4 and 5, the controller 54 may, for example, default on power-up to ten minutes per station once each day. As in the controller 10, the power-on default condition is signalled by a scrolling of the LEDs 60 through 68. To change the default condition, button 56 is first pushed to select a station - once for Station 1, twice for Station 2, and so on. Pushing button 56 a fifth time turns the controller 54 off and lights the no-watering LED 60. Any push of button 56 stops the scrolling, and the chosen station's LED repetitively blinks twice, indicating a ten-minute cycle duration. Button 58 can now be pushed one or more times to select the desired cycle length for that station. Successive pressings of button 58 will select 0, 5, 10 15, or 20 minutes. Each selection is confirmed by the repetitive blinking of the pertinent one of LEDs 62–66 with zero to four blinks, respectively.

If button 58 is not pushed for five seconds, or more, the program of button 58 resets, and the next push will again select 0 minutes.

In the block diagram of FIG. 5, the microcontroller 70 functions essentially as shown in FIG. 3. The manual operation of controller 54 and its operation while a watering cycle is in progress are also essentially the same as described above in connection with controller 10.

A third embodiment of the invention is directed at those installations in which a single station needs to be operated with little or no supervision in an environment in which power is not readily available. Because such a controller needs to rely on longterm battery power in humid or otherwise adverse environments, fail-safe circuitry with very low power consumption must be used.

Figure 6:
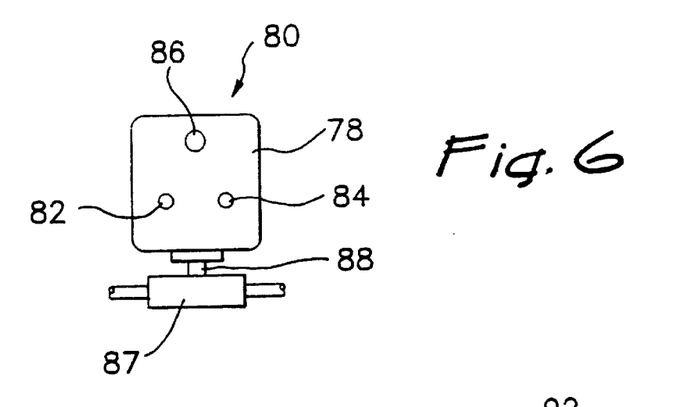
FIG. 6 is a front elevation of the face plate of a third embodiment of the invention.
Figure 7:
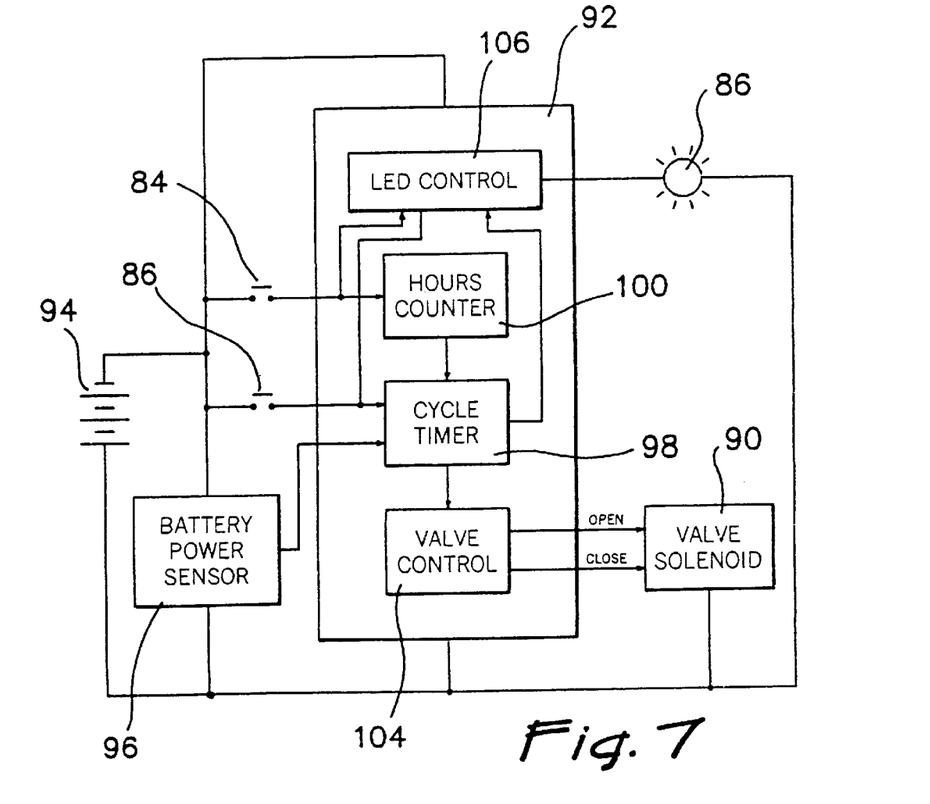
FIG. 7 is a block diagram of the circuitry of the controller of FIG. 6.
Figure 8:
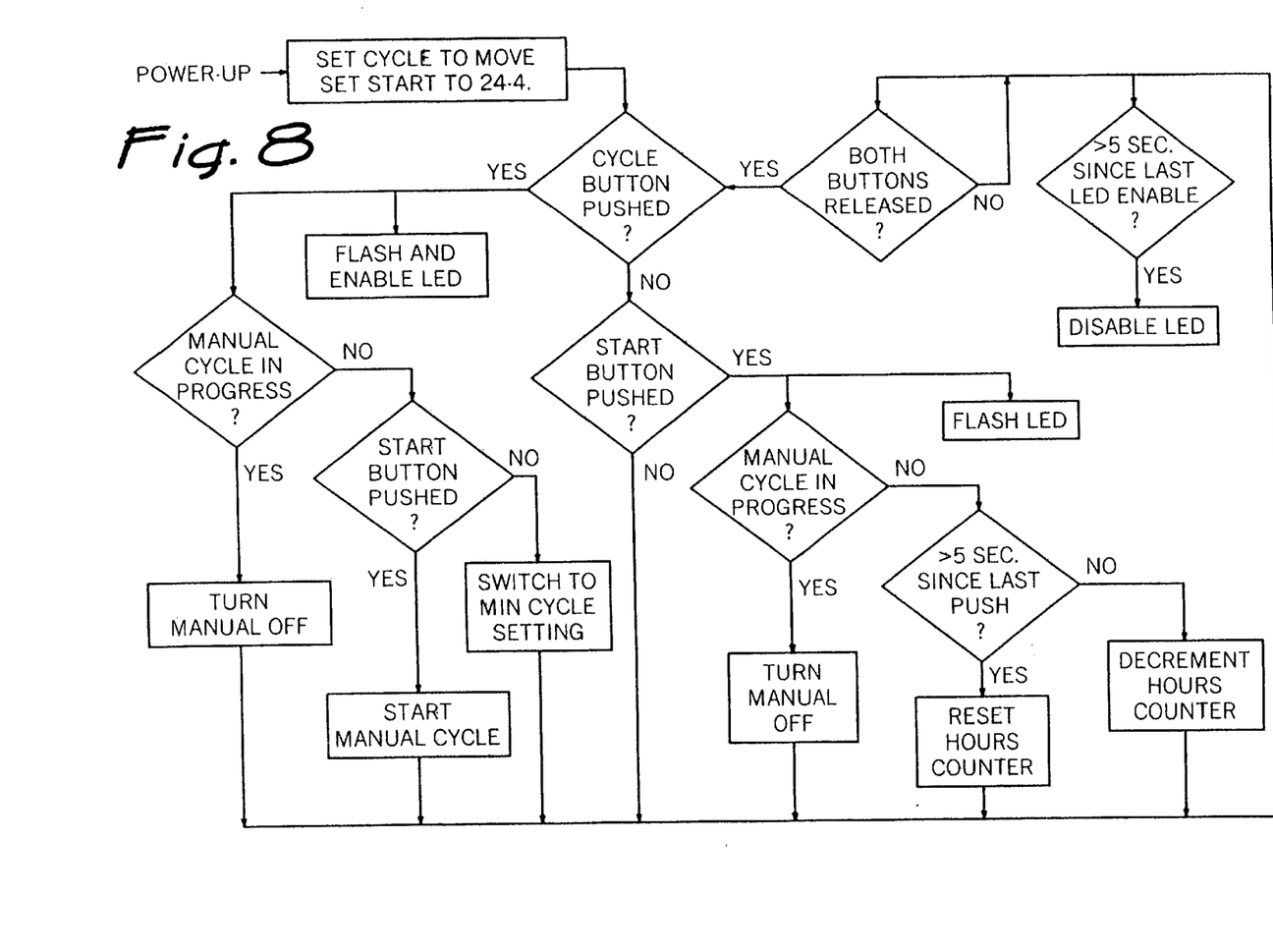
FIG. 8 is a partial flow diagram of the microprocessor of FIG. 7 illustrating the use of the pushbuttons of FIG. 6.

An embodiment satisfying these requirements is shown in FIGS. 6 through 8. In its sealed waterproof case 78 (FIG. 6), the single-station controller 80 has a cycle selection button 82, a start time selector button 84, and a single LED 86. The controller 80 is mounted on a conventional water valve 87 which is toggled between an open and a closed position by a plunger 88. The plunger 88 is in turn toggled between the open and closed positions by a latching solenoid 90 (FIG. 7), which is operated by momentary "open" and "close" signals from a microprocessor 92. Thus, the controller 80 consumes significant power only momentarily while switching from one valve state to the other.

The controller 80 is powered by a battery 94. Because a battery failure while the valve 87 is open could be catastrophic, a battery power sensor 96 is provided in the controller 80. When battery power drops below a predetermined safe level, the sensor 96 causes the cycle timer 98 in microprocessor 92 to close the valve 87 and lock itself in the "Off" mode until the battery 94 is replaced.

The microprocessor 92 includes four operational elements: an hours counter 100, the cycle timer 98, a valve actuator 104, and an LED control 106. The counter 100 cyclically counts off twenty-four one-hour intervals and then issues a start signal 108 to the cycle timer 98. The cycle timer 98 preferably includes a day counter and five selectable timing routines: Off (no watering), Some (e.g. 5 minutes every third day), More (e.g. 10 minutes every other day), Most (e.g. 20 minutes every day, preferably applied in two 10-minute cycles with an hour's delay between them), and Manual (e.g. 10 minutes). These routines (other than Manual) can be selected in the cycle timer 98 by successive pushes of the cycle selector button 82. The Manual routine is selected by pushing cycle selector button 82 and Start selector button 84 simultaneously. On power-up, the cycle timer 98 defaults to the More routine.

The cycle timer 98 provides "open" and "close" signals in accordance with the selected timing routine to the valve actuator 104, which in turn operates the locking solenoid 90 to open or close the water valve 87.

The LED control 106 causes the LED 86 to flash momentarily whenever button 82 or 84 is pushed, and to indicate the selected cycle routine by blinking, e.g. steady on for Off, one blink for Some, two blinks for More, and three blinks for Most. In Manual mode, the LED 86 remains off. In order to conserve power, the LED 86 is deactivated after five seconds.

FIG. 8 is a self-explanatory flow diagram illustrating the sequence of operation of the microprocessor 92. It should be noted that each push of the start button 84 decreases the hours counter 100 by one hour, so that the initial start time can be adjusted but each subsequent start occurs twenty-four hours (or a multiple of twenty-four hours in the Some and More modes) after the previous one. If the start button 84 has not been pushed for five seconds or more, the next push resets the hours counter 100 to its original setting.

Figure 9:
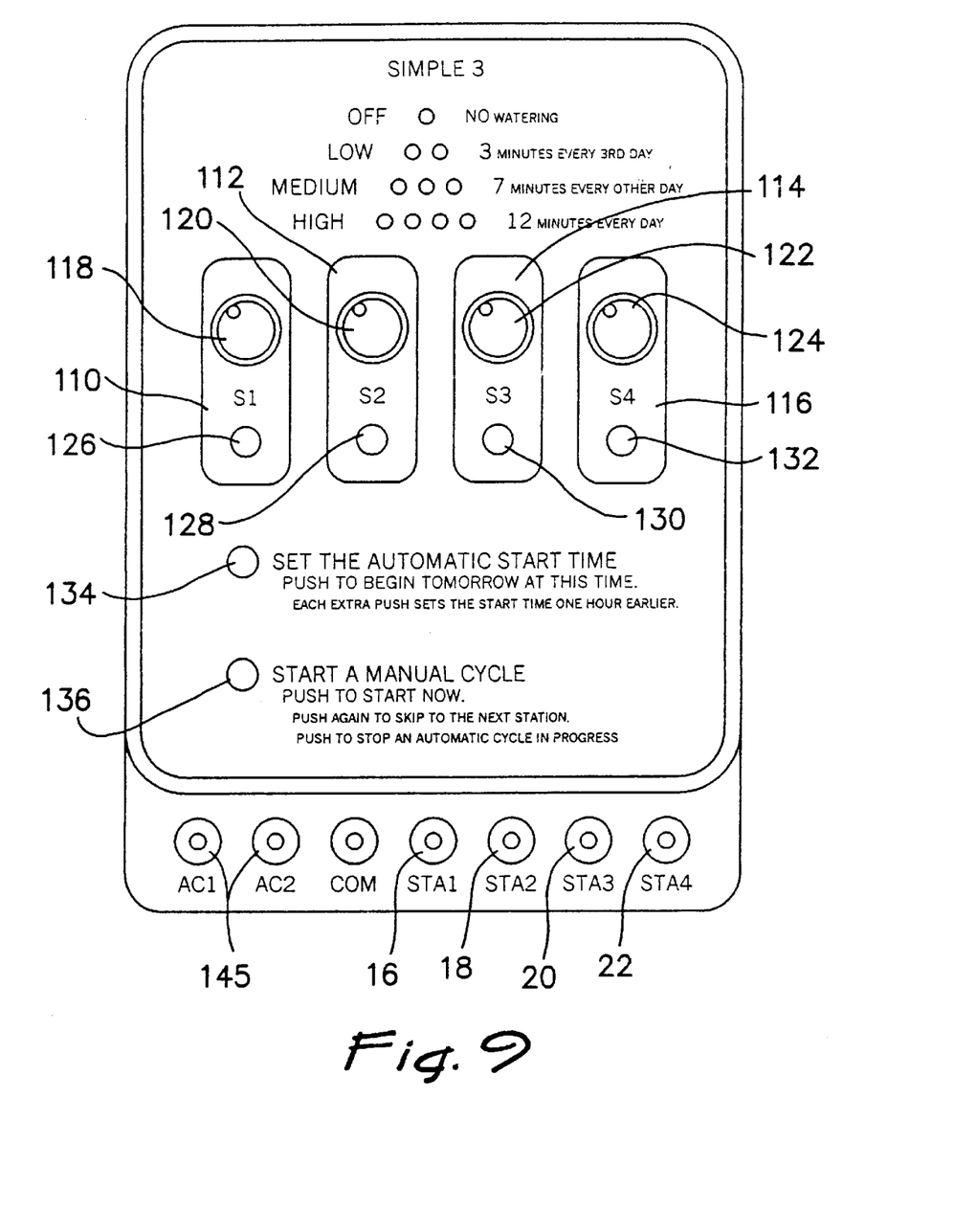
FIG. 9 is a front elevation of the face plate of a fourth embodiment of the invention.
Figure 10:
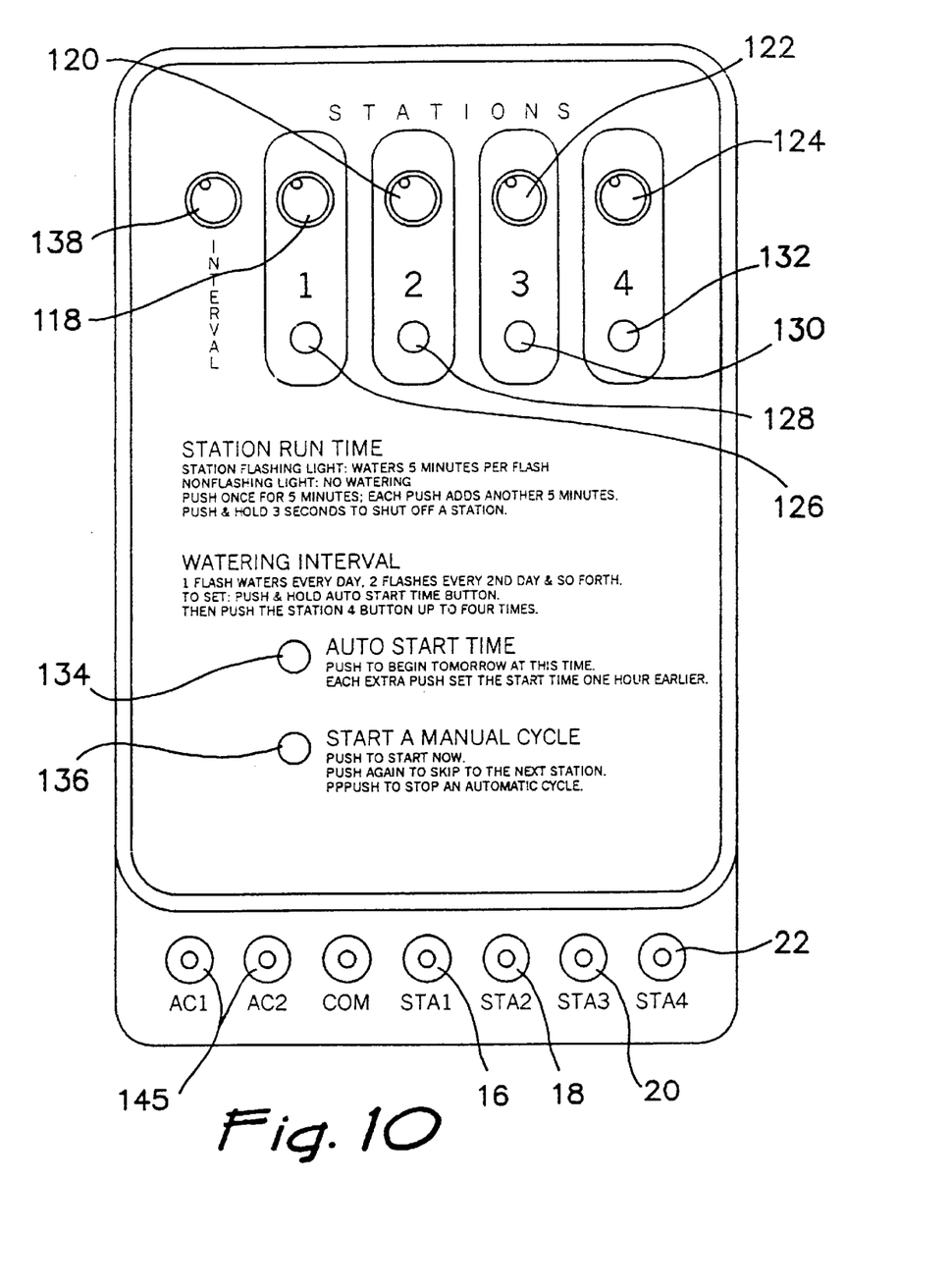
FIG. 10 is a front elevation of the face plate of a fifth embodiment of the invention.

FIGS. 9 and 10 illustrate additional preferred embodiments of the invention allowing individual setting of a plurality of watering stations. The device of FIG. 9 includes a plurality (e.g. four) switched stations 16, 18, 20 and 22 with individual control panels 110, 112, 114 and 116 Each of these control panels contains one of four LEDs 118, 120, 122 and 124, and one of four pushbuttons 126, 128, 130 and 132. In addition, a start time button 134 and a manual button 136 are provided.

Using a microprocessor control similar to that described in connection with FIGS. 2 and 5, the controller of FIG. 9, like the controllers of FIGS. 1 and 4, defaults on power-up to a setting of medium watering (e.g. 7 minutes every other day) and a start time of 24 hours from power-up. This condition is signalled by a scrolling flashing of the LEDs 118 through 122.

Each push of start time button 134 within a predetermined wait time decrements the start time of the first watering cycle by one hour from the 24-hour default, after which the watering cycles start at intervals of 24 hours or a multiple thereof from the first cycle. Pressing the manual button 136 starts a manual cycle or stops an automatic cycle. Each push while a station is running manually advances the cycle to the next station. Also like in the controllers of FIGS. 1 and 4, a short circuit in any station shuts off the controller and causes all of the LEDs 118 through 124 to flash simultaneously, with the number of flashes in each group of flashes identifying the shorted station.

In the controller of FIG. 9, the watering setting for each individual station is set by repeatedly pushing the respective button 126, 128, 130 or 132 to cycle the station through the available plurality of settings (e.g. Off: no watering; Low: 3 minutes every third day; Medium: 7 minutes every other day; and High: 12 minutes every day). The current setting is indicated by the flashing of the corresponding LED 118, 120, 122 or 124 in groups of one, two, three or four flashes depending on the selected setting. Although the Off setting could well be indicated by the absence of flashing, it is preferable to assign it one flash to prevent a misindication if the LED fails.

For users desiring greater flexiblity in setting the interval between watering cycles and the run time of any given station while retaining the simplicity of the controller, the embodiment of Fig. IO provides an additional LED 138, and uses a combination of pushbuttons 132 and 134 to set the cycle interval separately from the station run times.

Specifically, in the device of FIG. 10, holding down the start time button 134 while pushing button 132 increases the cycle interval one day for each push of button 132. The LED 138 indicates the selected interval setting by flashing in groups of one flash for each interval day.

Alternatively, the microcontroller 140 may be programmed so that start time button 134 must be held down until the interval LED flashes red, and button 136 must then be pressed to set the desired interval.

If the start time button 134 is not pushed, the pushbuttons 126 through 132 operate to set the run times for their respective stations. Each push of a button 126, 128, 130 or 132 increases the run time of its respective station by five minutes. Holding the button down, e.g. for three seconds, returns the run time to zero, i.e. turns the station off. The run time setting for each station is indicated by flashing of its associated LED 118, 120, 122 or 124 in groups of one flash for each 5 minutes of run time. More specifically, after one of the LEDs 118, 120, 122 or 124 flashes the run time value for that station, the next LED similarly flashes its run time value, and so on in a scrolling sequence across the LEDs 118, 120, 122 and 124. For a station that is off, its associated LED may be steadily on or steadily off. If any of the pushbuttons 126 through 132 are not pushed within five seconds after the preceding push, any subsequent pushes cause new run time values to be entered for that station.

In installations that include drip irrigation systems, it may be necessary to run a station for two hours or more. Setting such a run time in five-minute increments, and checking it by counting flashes each representing five minutes of run time, would be awkward at best. In the controller of FIG. 10, this problem can be obviated by using a plurality of the pushbuttons 126 through 132, and multicolor LEDs 118 through 124. Such LEDs are commercially available. They show red if one lead of the LED is energized, green if the other is energized, and orange if both are energized.

Thus, different increments can be set by the pushbuttons and signalled by the LEDs. For example, if the manual button 136 in FIG. 10 is held down, pushing any of the buttons 126, 128, 130 or 132 causes the microcontroller 140 to cyclically set the run time increments produced by the pushing of buttons 126, 128, 130 or 132 alone to, e.g., 2 minutes (signalled by red LED light and useful for garden sprinkler systems), 10 minutes (green LED light, useful for rotating sprinkler systems), or one hour (orange LED light, useful for drip irrigation systems). The increment value thus selected is applied to all station settings, so that each push of a button 126, 128, 130 or 132 alone will increment the run time of the corresponding station by the selected increment value. When the run times are set, the color of the LEDs 118 through 124 indicates the interval signified by each flash of the LED. For example, two orange flashes of an LED 118, 120, 122 or 124 indicate that the corresponding station is set for two hours. .

Figure 11:
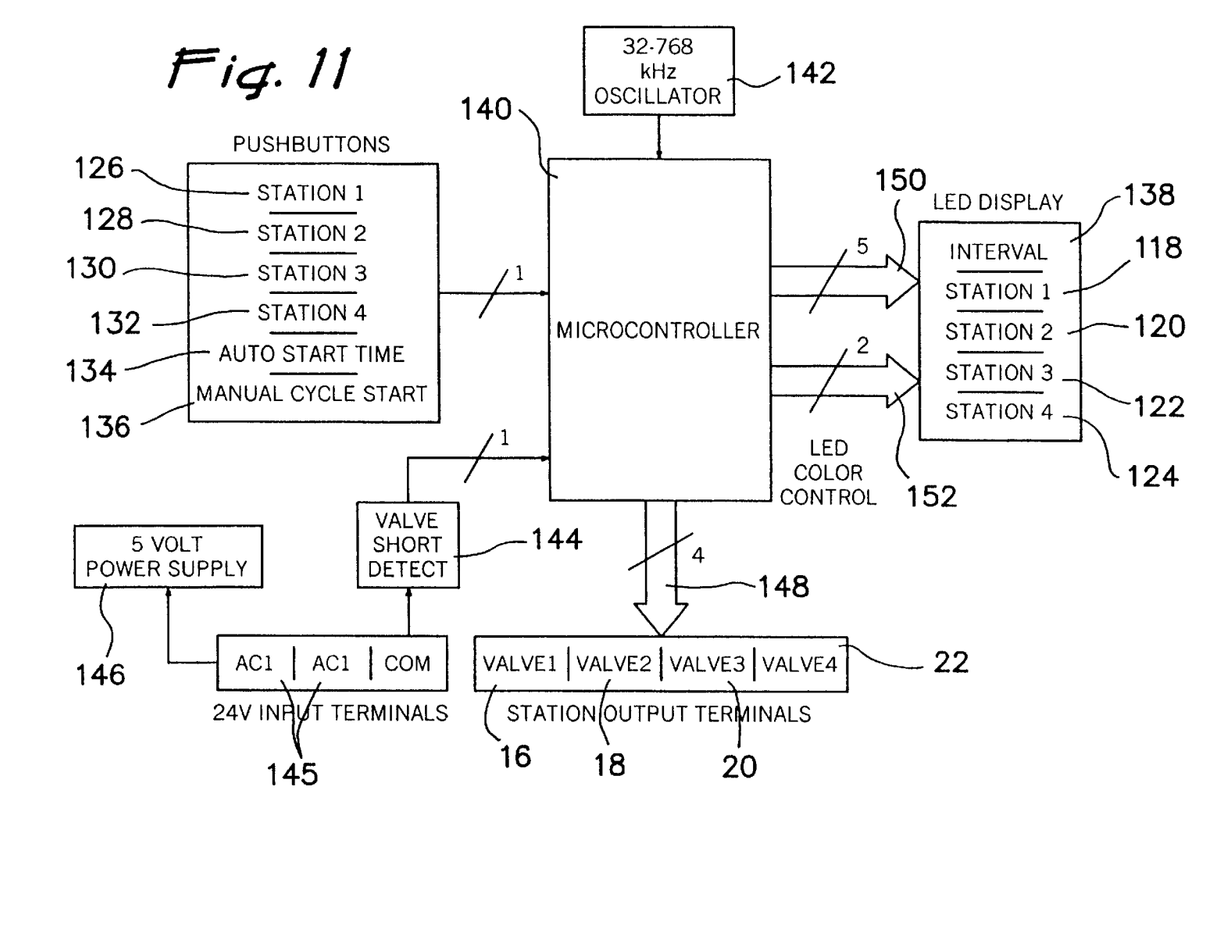
FIG. 11 is a block diagram of the circuitry of the controller of FIG. 11.
Figure 12:
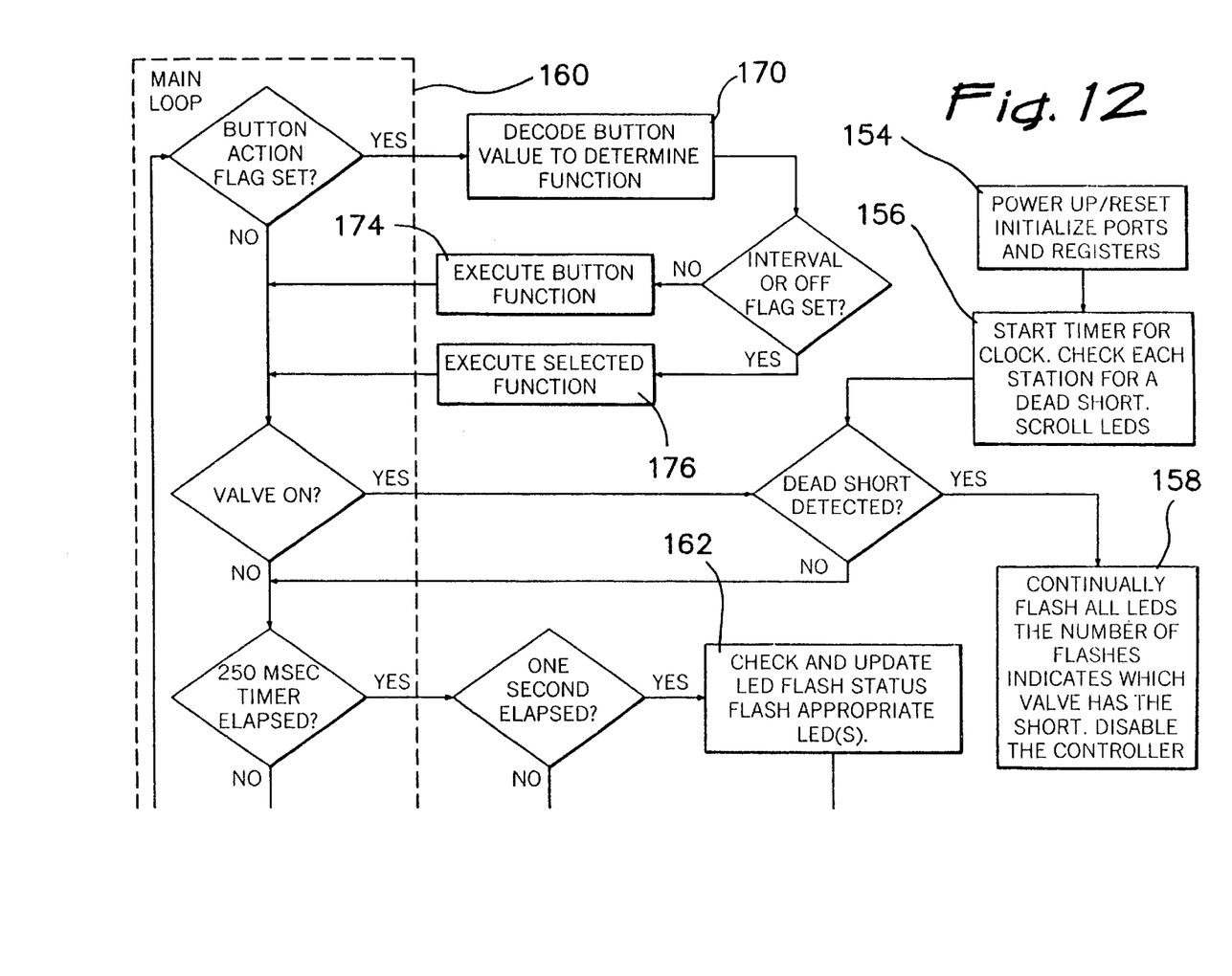
FIG. 12 is a flow chart of the operation of the microcontroller of FIG. 11.

As shown in FIG. 11, the controller of FIG. 10 is operated by a programmed microprocessor or microcontroller 140 whose internal operation is illustrated by the flow chart of FIG. 12. The microcontroller 140 is driven by an oscillator 142. The frequency of oscillator 142 is set at 32.768 kHz for the reasons stated in the discussion of FIG. 2 above.

The inputs to the microcontroller 140 are the pushbuttons 126 through 134 and the valve short circuit (i.e. AC power overcurrent) detector 144. The AC power supply 145, which may advantageously be 24 V, also operates a 5 V DC power supply 146 for the microcontroller 140. The outputs of microcontroller 140 are the power outputs 148 to the sprinkler valves 16 through 22, the LED illumination controls 150 for the LEDs 118 through 124 and 138, and the color control 152 for the LEDs 118 through 124.

FIG. 12 illustrates generally the operation of the microcontroller 140. On power-up or reset, the microcontroller program initializes all ports and registers at 154, and causes LEDs 118 through 124 to scroll. It also starts the timer and momentarily checks each station 16 through 22 at 156 for short circuits. If a short circuit is detected, the program shuts off the controller at 158 and continually flashes the LEDs 118 through 124 to indicate, as described above, which station is shorted.

If no short circuit is detected, the program enters the main loop 160 and checks the status of the controller 140 every 250 ms at 162. The status loop 163 checks and updates the LED flash status every second, the station status every minute, and the watering cycle start time status every hour.

When the clock time equals the cycle start time programmed by the operator (or 24 hours from power-up if the operator does not program any start time), a watering cycle in accordance with the flags set at 164 and 166 and the count of flash register 168 is initiated at 170. If any valve station 16 through 22 is on at 171 when the start time is reached, a watering cycle is considered to be in progress, and the program returns to the main loop 160.

The pressing of any button 126 through 134 at 172 results in the identification of the pressed button at 164 and the setting of the function flag associated with it. If it is the first button pressed after a power-up or reset, the scrolling of the LEDs 118 through 124 is also stopped at this point. Depending upon the operator's action, a special function flag may be set at 166, and cycle timing registers may be incremented at 168 for the purposes discussed herein.

When the proper flags have been set by the pushing of the appropriate button or buttons, the next iteration of the main loop 160 executes the button function at 174 or other selected function at 175. For example, the selected duration of watering for a given station may be entered into the memory of microcontroller 140. Whenever any valve 16 through 22 is on, the main loop 160 continually checks it for short circuits every 250 ms.

It is to be understood that the exemplary irrigation controllers described herein and shown in the drawings represent only presently preferred embodiments of the invention. Indeed, various modifications and additions may be made to such embodiments without departing from the spirit and scope of the invention. Thus, other modifications and additions may be obvious to those skilled in the art and may be implemented to adapt the present invention for use in a variety of different applications.

We claim:

1. An irrigation controller for residential sprinkler systems, comprising:
    a) a set of actuators;
    b) a set of individually illuminable indicators;
    c) a set of watering station terminals; and
    d) a microprocessor actuated by said actuators to selectively energize said watering station terminals, said microprocessor operating said indicators to convey information regarding the status of said controller;
    e) said microprocessor operating said indicators so as to convey information concerning the status of said watering station terminals by a combination of flashing illumination patterns and sequence of illumination of selected ones of said indicators.

2. The irrigation controller of claim 1, in which said microprocessor, on power-up, automatically sets said controller to energize said watering station terminals in sequence each for a predetermined time at predetermined intervals beginning at a predetermined start time.

3. The irrigation controller of claim 1, in which said watering station terminals are energizeable by the operation of only one of said actuators in accordance with a selected one of a set of predetermined combinations of "on" times and repetition rates.

4. The controller of claim 3, in which the same set of indicators indicates both the selected one of said set of combinations and the identity of the terminal energized at a given time.

5. The irrigation controller of claim 1, in which said microprocessor checks for short circuits in said watering station terminals before initiating any watering station terminal energization, and performs an energization sequence only if no short circuit is detected.

6. The controller of claim 5, in which said microprocessor operates said indicators in an illumination identifying both the presence of a short circuit and the terminal at which it has occurred.

7. An irrigation controller for residential sprinkler systems, comprising:
    a) a set of pushbuttons;
    b) a set of light emitting diodes;
    c) a set of watering stations; and
    d) a microprocessor actuated by said pushbuttons to selectively energize said watering stations at selected intervals and for selected run times, said microprocessor operating said light emitting diodes to convey information regarding the selected intervals and run times;
    e) said selection of intervals and run times being accomplished by a repetitive actuation of at least one of said set of pushbuttons; and
    f) said microprocessor operating said light emitting diodes to convey said information by patterned groups of illumination flashes.

8. The controller of claim 7, in which said light-emitting diodes include multi-color light-emitting diodes, and said patterned groups include illumination flashes in a plurality of colors on the same diode.

9. The controller of claim 7, in which said pushbuttons include one station pushbutton associated with each station, a start time pushbutton, and a manual mode, the interval being set by repetitively actuating a combination of said start time pushbutton and said manual mode pushbutton, and the run time of a station being set by the repetitive actuation of the station pushbutton associated with that station.

10. The controller of claim 9, in which said combination is a combination of said start time pushbutton and one of said station pushbuttons.

11. The controller of claim 7, in which one pushbutton and one indicator are associated with each of said stations, and in which predetermined combinations of intervals and run times are separately selectable for each station by repetitive actuation of the station pushbutton associated with that station.

12. The controller of claim 5, in which the program of said microprocessor has a continuously iterating main loop, and checks for short circuits upon each iteration of said main loop.

13. The controller of claim 1, in which said microprocessor is programmed to operate a station in separate time segments separated by at least a minimum time interval if the total selected time of operation of that station during a given cycle exceeds a predetermined maximum time of continuous operation.

14. An irrigation controller, comprising:
    a) means for selecting an operating parameter for a watering station controlled by said controller, the value of said parameter being the sum of a selected plurality of increments of different sizes; and
    b) an LED arranged to display the value of the selected parameter by flashing, in a different color for each increment size, the number of increments selected.

* * * * *